G. J. LEBER.
FLUID REGULATOR.
APPLICATION FILED JUNE 8, 1908.
956,585.
Patented May 3, 1910.
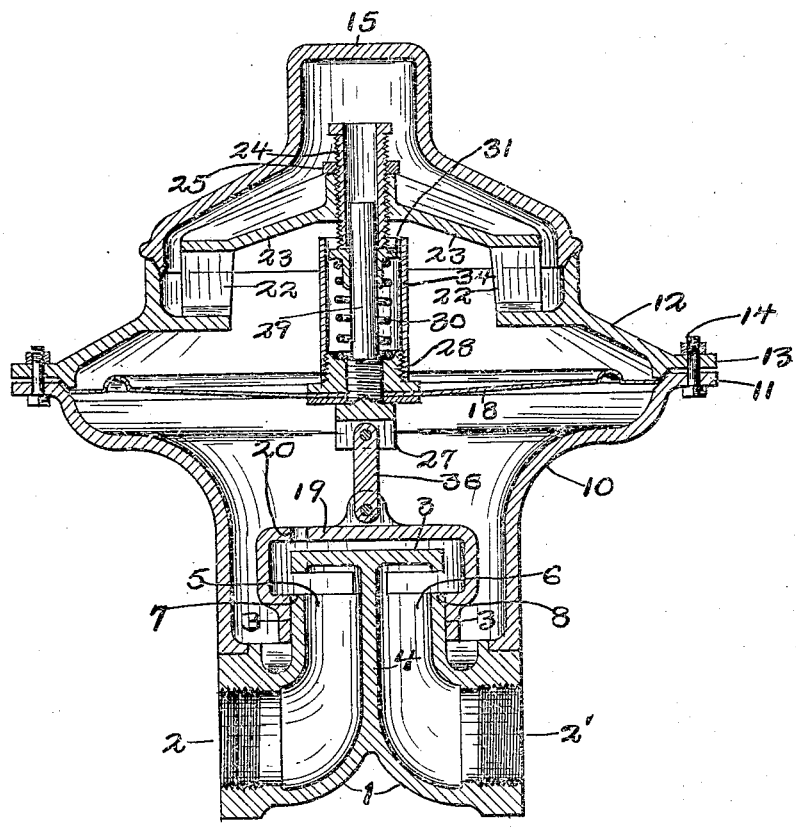
Witnesses:
H. J. Gettins.
Daniel E. Haly.
Inventor:
George J. Leber
by Lynch & Dorer
Attorneys.

UNITED STATES PATENT OFFICE.

GEORGE J. LEBER, OF CLEVELAND, OHIO.

FLUID-REGULATOR.

956,585. Specification of Letters Patent. Patented May 3, 1910.

Application filed June 8, 1908. Serial No. 437,287.

*To all whom it may concern:*

Be it known that I, GEORGE J. LEBER, a citizen of the United States of America, residing at Cleveland, in the county of Cuyahoga and State of Ohio, have invented certain new and useful Improvements in Fluid-Regulators; and I hereby declare the following to be a full, clear, and exact description of the invention, such as will enable others skilled in the art to which it pertains to make and use the same.

This invention relates to new and useful improvements in fluid pressure regulators.

In particular the object of this invention is to provide a device of this character which will regulate or control the pressure of the gas as admitted to the service pipes of a house so as to maintain an approximately constant or even pressure in the service pipes regardless of the variation or change of pressure in the gas main or supply pipe.

A further object of the invention is to provide a device of this character which will be simple in construction and effective in operation and at the same time extremely sensitive to any variation in pressure.

My invention therefore consists in certain features of construction and combination of parts as described in the specification, pointed out in the claims and illustrated in the accompanying drawing.

In the accompanying drawing is shown a central section of a valve embodying my invention.

In general the invention comprises a valve which is connected to a diaphragm or other pressure actuated device in the chamber into which the gas flows when the valve is open and is controlled by the pressure on the diaphragm so that the tendency of the pressure exerted by the gas is to close the said valve. A spring is provided for holding the valve open against the pressure of the gas and means is provided for regulating the tension of the spring and thereby determining the amount of pressure necessary to close or partially close the valve.

Referring to the drawings 1 represents a coupling having threaded pipe connections 2 and 2′ leading to the gas supply main and to the building in which the gas is to be consumed and having intermediate the connections 2 and 2′ a hollow tubular extension 3 and which, as will be explained, serves as a valve seat and which is preferably closed at the top. The coupling 1 is provided with a partition 4 which extends up into the hollow valve seat dividing the same into two chambers 5 and 6 and in the side wall of the valve seat are formed openings 7 and 8 which communicate with the chambers 5 and 6 respectively. Seated upon the top of the coupling and secured thereto in any desired manner is a chamber or casing consisting of a lower portion 10 having a flange 11 at the top, a portion 12 having a flange 13 opposite the flange 11, the two portions 10 and 12 being secured together by bolts 14 passing through the flanges 11 and 13. On top of the portion 12 is a removable cap 15. Held tightly between the flanges 11 and 13 is a diaphragm 18 which may be of any desired material as long as it has the necessary requirements, as to flexibility, durability, and if desired elasticity.

The valve proper comprises a hollow member 19 which is arranged to fit down over the valve seat, the lower portion being restricted so that the walls thereof closely encircle the valve seat while the upper part is sufficiently large to leave a passageway between the inner walls thereof and the valve seat. In the top of the valve is formed an opening 20.

Secured to the upper part of the casing, above the diaphragm 18, preferably upon the oppositely extending flanges 22, is a yoke or cross member 23 provided with a threaded opening which receives a vertically adjustable bushing 24. A lock nut 25 is preferably provided for preventing movement of the bushing after it has been adjusted.

Secured on opposite sides of the diaphragm 18 are two members 27 and 28 which are clamped together by a threaded projection or stem 29 on the member 27 and said stem 29 extends up into the adjustable bushing 24. On the stem 29 is arranged a coil spring 30, the lower end of which rests on the member 28 and on the upper end thereof is arranged a sliding thimble or collar 31 which abuts against the lower end of the bushing 24 and therefore by adjusting the bushing up or down the tension of the spring can be easily regulated. On the member 28 is arranged a stop 34 which limits the upward movement of the diaphragm. The valve 19 is operatively connected to the member 27 by means of a link 36.

The operation of the device is as follows:—When the valve is wide open the parts will be as shown in the drawing and the gas will pass into the chamber 5 then out through the opening 7 and between the top of the valve seat and the valve and then through the opening 8 into the chamber 6 and then into the service pipe. Some of the gas will also pass through the opening 20 into the chamber below the diaphragm. Now if the pressure of the gas increases the pressure on the diaphragm will overcome the pressure of the spring causing the diaphragm to move up, thereby lifting the valve and partially closing the openings in the valve seat and thereby reducing the quantity of gas permitted to pass into the supply pipe. If the gas pressure falls the diaphragm will move down permitting the valve to open again. In this way the quantity of gas furnished to the supply pipe will be kept constant, insuring an economical consumption of gas and the steady burning of the lights.

What I claim is,—

1. In a device of the character described, a casing, a chambered valve seat arranged within said casing and having openings in the side walls thereof, an inlet port communicating with one of said chambers and an outlet port communicating with the other chamber, a hollow valve arranged to telescope with said valve seat so as to control the openings therein and form a passageway for the fluid from the inlet chamber to the outlet chamber, a diaphragm arranged above said valve seat, means for admitting the fluid to said casing so as to exert a pressure on said diaphragm and means operatively connecting said valve and said diaphragm.

2. In a device of the character described, a casing, a chambered valve seat arranged within said casing and having openings in the side walls thereof, an inlet port communicating with one of the chambers and an outlet port communicating with the other chamber, a hollow valve arranged to telescope with said valve seat so as to control the openings therein and form a passageway for the fluid from the inlet chamber to the outlet chamber, said valve having an opening through which the fluid may pass to the interior of said casing, a diaphragm arranged above said valve seat and means for operatively connecting said diaphragm with said valve.

3. In a device of the character described, a casing, a chambered valve seat arranged within said casing and having openings in the side walls thereof, an inlet port communicating with one of said chambers, an outlet port communicating with the other chamber, a hollow valve arranged to telescope with said valve seat so as to control the openings therein and form a passageway for the fluid from the inlet chamber to the outlet chamber, said valve having an opening through which the fluid may pass to the interior of said casing, a diaphragm arranged above said seat, means operatively connecting said valve and said diaphragm and means for yieldingly holding said diaphragm against upward movement.

4. In a device of the character described, a casing, a chambered valve seat arranged within said casing and having openings in the side walls thereof, an inlet port communicating with one of said chambers, an outlet port communicating with the other chamber, a hollow valve arranged to telescope with said valve seat so as to control the openings therein and form a passageway for the fluid from the inlet chamber to the outlet chamber, said valve having an opening through which the fluid may pass to the interior of said casing, a diaphragm arranged above said valve seat, means operatively connecting said valve and said diaphragm and a spring for yieldingly holding said diaphragm against upward movement.

5. In a device of the character described a casing provided with intake and outlet ports, a hollow valve seat arranged in said casing so as to cut off communication between the intake and outlet ports except through the valve seat, a partition dividing the interior of said valve seat into chambers, said chambers being provided with openings, a diaphragm arranged in said casing above said valve seat, a valve arranged to close the openings in said valve seat, said valve being provided with an opening, an operative connection between said valve and said diaphragm and means for yieldingly resisting the upward movement of said diaphragm.

6. In a device of the character described a casing provided with intake and outlet ports, a hollow valve seat arranged in said casing so as to cut off communication between the intake and outlet ports except through said valve seat, a partition dividing the interior of said valve seat into chambers, said chambers being provided with openings in the side walls thereof, a valve arranged to move up and down on the outside of the valve seat so as to control the openings in the side walls of the chambers, a diaphragm arranged above said valve seat, a spring for holding said diaphragm against upward movement and means operatively connecting the valve and the diaphragm so that an increase in pressure will tend to close said openings in the side walls of the chambers.

7. In a device of the character described a casing provided with intake and outlet ports, a hollow valve seat arranged in said casing so as to cut off communication between the intake and outlet ports except through said valve seat, a partition dividing the interior of said valve seat into chambers, said chambers being provided with openings in the side walls thereof, a valve arranged to move up and down on the outside of said valve seat so as to control the openings in the side walls of said chambers, said valve being provided with an opening, a diaphragm arranged above said valve seat, a spring for holding said diaphragm against upward movement, means for regulating the tension of said spring and means for operatively connecting the valve and the diaphragm so that pressure sufficient to overcome the tension of said spring will tend to close said openings in the side walls of said chambers.

8. In a device of the character described a casing provided with intake and outlet ports, a hollow valve seat arranged in said casing so as to cut off communication between the intake and outlet ports except through said valve seat, a partition dividing the interior of said valve seat into chambers, said chambers being provided with openings in the side walls thereof, a valve arranged to inclose said valve seat and provided with an opening, a diaphragm arranged above said valve seat, means for yieldingly holding said diaphragm against upward movement and means operatively connecting said valve and said diaphragm so that an increase of pressure will tend to close said openings in the side walls of said chambers.

9. In a device of the character described a casing provided with intake and outlet ports, a hollow valve seat arranged in said casing so as to cut off communication between the intake and outlet ports except through said valve seat, a partition dividing the interior of said valve seat into chambers, said chambers being provided with openings in the side walls thereof, a valve arranged to move up and down on the outside of said valve seat so as to control the openings in the side walls of said chambers, said valve being provided with an opening, a stop arranged to limit the upward movement of said valve, a diaphragm arranged above said valve seat, a spring for holding said diaphragm against upward movement, means for regulating the tension of said spring and means for operatively connecting the valve and the diaphragm so that pressure sufficient to overcome the tension of said spring will tend to close said openings in the side walls of said chambers.

In testimony whereof, I sign the foregoing specification, in the presence of two witnesses.

GEORGE J. LEBER.

Witnesses:
VICTOR C. LYNCH,
N. L. McDONNELL.